United States Patent [19]

Fang

[11] 4,151,002

[45] Apr. 24, 1979

[54] TALL OIL PITCH BASED THERMOPLASTIC ADHESIVE

[75] Inventor: Henry H. Fang, Mount Royal, Canada

[73] Assignee: Northwood Mills Ltd., Toronto, Canada

[21] Appl. No.: 814,628

[22] Filed: Jul. 11, 1977

[51] Int. Cl.$^2$ .................. C08L 93/00; C08L 97/02
[52] U.S. Cl. ........................... 106/123 TQ; 260/101
[58] Field of Search .................. 106/123 TQ; 260/101, 260/97.5

[56] References Cited

U.S. PATENT DOCUMENTS

| | | | |
|---|---|---|---|
| 2,753,330 | 7/1956 | Drew et al. | 260/101 |
| 3,253,937 | 5/1966 | Stumpt | 106/123 TQ |
| 3,935,145 | 1/1976 | Rudolphy | 260/101 |

OTHER PUBLICATIONS

Chem. Abst. 51: 11,734f.

*Primary Examiner*—Theodore Morris
*Attorney, Agent, or Firm*—Fleit & Jacobson

[57] ABSTRACT

There is provided a thermoplastic adhesive which consists of a reaction product of tall oil pitch with an organic anhydride, such as maleic anhydride, saponified with a multivalent metal hydroxide, such as calcium hydroxide. The reaction between tall oil pitch and the anhydride is preferably carried out by heating in the range of 120° C. to 200° C. for one to eight hours. The saponification is either complete or partial and is carried out by reacting the adduct obtained from the reaction of the tall oil pitch with the anhydride, with a suitable amount of the multivalent metal hydroxide at about 200° C. for ten to thirty minutes. The produced adhesive is solid at room temperature and can possess, depending on the formulation, either high binding strength or prolonged pressure-sensitive character.

10 Claims, No Drawings

TALL OIL PITCH BASED THERMOPLASTIC ADHESIVE

This invention relates to a novel tall oil pitch based thermoplastic adhesive and to a method of producing same.

Various attempts have been made in the past to find commercial utilization for tall oil pitch which is a by-product of tall oil distillation, having a very low economic value. Thus, U.S. Pat. No. 3,253,937 of May 31, 1966 to Joseph H. Stump, Jr., relates to a tall oil pitch based paper size and its method of preparation, according to which tall oil pitch is reacted with formaldehyde and the resulting product is saponified with an aqueous, alkaline solution of an alkali metal compound such as sodium hydroxide. Also, U.S. Pat. No. 2,603,571 of July 15, 1952 to William Castellano, provides a mastic floor covering based on a reaction product obtained by esterifying a mixture of tall oil pitch and an acidic fraction of oxidized paraffin wax with a polyfunctional alcohol having at least three hydroxyl groups.

In a more recent U.S. Pat. No. 3,775,146 of Nov. 27, 1973 to Erick Reckziegel et al., a hot melt adhesive composition is described, based on natural resins such as tall oil resins and colophony resins which may contain certain amounts of resin pitch and also free fatty acids. The composition must, however, also contain a surface active polyethylene oxide adduct with a specific Griffin HLB value and, preferably, some ethylene/vinyl acetate copolymers as well as high-boiling hydrocarbons, to produce the desired hot melt adhesive effect.

In spite of these attempts, tall oil pitch is still considered to be a waste material which is usually either discarded or burned. It has now been surprisingly found that tall oil pitch can be used to produce in a simple and economical manner a thermoplastic adhesive with strong binding strength or, depending on the formulation, a thermoplastic adhesive with prolonged pressure-sensitive character.

Thus, according to the present invention, tall oil pitch (rather than pure fatty acids or rosin acids) is reacted with an organic anhydride having an ethylenic linkage in $\alpha,\beta$ position, flanked by carbonyl groups, such as maleic anhydride or phthalic anhydride, to form an adduct which is then saponified, totally or partially, with a multivalent metal hydroxide, such as calcium hydroxide or aluminum hydroxide, to form the desired thermoplastic adhesive. If the saponification is essentially complete, a thermoplastic adhesive with a good binding strength is obtained, which is solid at room temperature; if the saponification is partial, a thermoplastic adhesive with prolonged pressure-sensitive character is obtained, which is also solid at room temperature.

The tall oil pitch is reacted with the organic anhydride in desired manner such as to achieve an essentially complete chemical reaction between these compounds; preferably, this may be done by heating said tall oil pitch in the range of 120° C. to 200° C. for one to eight hours with about 4 to 15% by weight of the organic anhydride relative to the weight of the tall oil pitch, but if lower temperatures are used, longer reaction times will be required.

The resulting adduct is then subjected to complete (which also means essentially complete) or partial saponification with a multivalent metal hydroxide, preferably in the following manner:

(a) Complete saponification 100 parts by weight of the adduct are reacted with about 6 to 15 parts by weight of the multivalent metal hydroxide, e.g. calcium hydroxide, at about 200° C. for ten to thirty minutes, to form a product which is solid at room temperature and which can be used as a thermoplastic adhesive with high binding strength.

(b) Partial saponification 100 parts by weight of the adduct are reacted with about 1 to 5 parts by weight of the multivalent metal hydroxide, e.g. calcium hydroxide, at about 200° C. for ten to twenty minutes, to form a product which is solid at room temperature and which can be used as a pressure-sensitive thermoplastic adhesive.

The following non-limitive examples will further illustrate the invention:

EXAMPLES 1. 9 parts by weight of tall oil pitch were mixed with 1 part by weight of maleic anhydride and heated at 200° C. for one hour in a closed system to form a maleic adduct. Then, 100 parts by weight of the adduct were mixed with 10 parts by weight of calcium hydroxide and heated for 10 minutes. The product was a thermoplastic adhesive which, at room temperature, had the appearance of a black solid material. The binding strengths of the adhesive product, of pitch-calcium hydroxide soap and of pitch-maleic anhydride adduct were compared:

| Sample | Binding Strength, kg/cm$^2$ |
| --- | --- |
| Pitch-Ca(OH)$_2$ | 6.2 ± 0.9 |
| Pitch-Maleic Anhydride | 6.0 ± 0.5* |
| Pitch-Maleic Anyhdride-Ca(OH)$_2$ | 13.9 ± 1.3 |

*Heated at 200° C. for 90 minutes

The binding strength of the adhesive product was more than double that of calcium soap or of maleic adduct. Water resistance of the product was also better than that of the calcium soap.

2. The same maleic adduct as in Example 1 was formed. Then, to 100 parts by weight of the adduct, 5 parts by weight of calcium hydroxide were added and heated at 200° C. for ten minutes. The adhesive product had a binding strength of 4.6 kg/cm$^2$ and prolonged pressure-sensitive character. In contrast, the maleic adduct itself was too brittle at room temperature for practical use. 100 parts of the tall oil pitch was also heated with 5 parts of calcium hydroxide at 200° C. for ten minutes. The product remained semi-solid and could not be used as an adhesive. 3. The same maleic adduct as in Example 1 was formed; then 100 parts by weight of the adduct and 10 parts by weight of monovalent metal hydroxide, such as sodium hydroxide, were heated at 200° C. for ten minutes. The product had much lower binding strength, and much reduced water resistance than the product obtained in Example 1. The sodium hydroxide modified product was very brittle at room temperature for practical use. It is, therefore, obvious that a monovalent metal hydroxide is not suitable for the purposes of the present invention and a multivalent metal hydroxide must be used to obtain the desired result. 4. 9 parts by weight of tall oil pitch and 1 part by weight of paraformaldehyde were gradually heated with agitation, to 150° C. over a period of one hour, then to 200° C. over a period of one hour, and held at 200° C. for two hours, a total of four hours, when the pitch-formaldehyde chemical reaction was complete. Then, 100 parts by weight of the mixture and 10 parts by weight of calcium hydroxide were heated at 200° C. for ten minutes. The product had much lower binding strength and much reduced water resistance than the product obtained in Example 1.

5. Procedures as in Example 1 were repeated, except paraformaldehyde was used instead of maleic anydride. The final product had much lower binding strength and much reduced water resistance than the product obtained in Example 1. Thus, an organic anhydride having an ethylenic linkage in $\alpha,\beta$ position flanked by carbonyl groups must be used in accordance with this invention, rather than an aldehyde.

The thermoplastic adhesive obtained in accordance with the present invention has several important advantages over similar adhesives now on the market. One of the advantages is the low cost of the product which is due to the fact that the main raw material used is tall oil pitch and the other reactants are also readily available low cost products. Thus, the resulting adhesive has a considerably lower cost than similar products on the market. Also, the method of preparation of the adhesive is simple and efficient and involves no special costly steps or operations. Another advantage is the low temperature flexibility of the novel adhesive. It has been found that it remains flexible at a temperature as low as 0° C., whereas most known thermoplastic adhesives available on the market become brittle at 8° C. or even higher temperatures. Finally, the process according to the present invention has an important advantage because of its versatility; by a slight modification of the saponification stage, a different type of adhesive can be produced. Thus, it is believed that an important advance in the art has been achieved.

What is claimed is:

1. A thermoplastic adhesive essentially consisting of a reaction product of tall oil pitch with an organic anhydride having an ethylenic linkage in a $\alpha,\beta$ position, flanked by carbonyl groups, saponified with a multivalent metal hydroxide.

2. Thermoplastic adhesive according to claim 1, wherein the organic anhydride is in a proportion of about 4 to 15% by weight relative to the weight of the tall oil pitch.

3. Thermoplastic adhesive according to claim 2, wherein the organic anhydride is maleic anhydride or phthalic anhydride.

4. Thermoplastic adhesive according to claim 1, wherein the reaction product is saponified with about 6 to 15% by weight of calcium hydroxide, relative to the weight of said reaction product.

5. Thermoplastic adhesive according to claim 1, which is pressure-sensitive and wherein the reaction product is partially saponified with about 1 to 5% by weight of calcium hydroxide, relative to the weight of said reaction product.

6. A method of producing a thermoplastic adhesive, which comprises reacting tall oil pitch with an organic anhydride having an ethylenic linkage in $\alpha,\beta$ position, flanked by carbonyl groups, and saponifying the resulting adduct with a multivalent metal hydroxide.

7. Method according to claim 6, wherein the tall oil pitch is reacted with about 4 to 15% by weight of the organic anhydride relative to the weight of said tall oil pitch, and the resulting adduct is at least partially saponified with the multivalent metal hydroxide.

8. Method according to claim 7, wherein said organic anhydride is maleic anhydride or phthalic anhydride and the reaction with the tall oil pitch is carried out by heating a mixture of said tall oil pitch and of said organic anhydride in the range of 120° C. to 200° C. for one to eight hours.

9. Method according to claim 8, wherein 100 parts by weight of the resulting adduct are reacted with about 6 to 15 parts by weight of calcium hydroxide at about 200° C. for ten to thirty minutes, thereby forming a thermoplastic adhesive which is solid at room temperature.

10. Method according to claim 8, wherein 100 parts by weight of the resulting adduct are reacted with about 1 to 5 parts by weight of calcium hydroxide at about 200° C. for ten to twenty minutes, thereby forming a thermoplastic adhesive which is pressure-sensitive and which is solid at room temperature.

* * * * *